United States Patent
Cheng et al.

(10) Patent No.: US 12,037,256 B2
(45) Date of Patent: Jul. 16, 2024

(54) DEVICE AND METHOD FOR MAKING A HOLLOW TUBE OF MICRON-SIZED CRYSTALLINE MAGNESIUM SULFATE

(71) Applicant: SHANXI UNIVERSITY, Taiyuan (CN)

(72) Inventors: Huaigang Cheng, Taiyuan (CN); Fangqin Cheng, Taiyuan (CN); Yanjie Huang, Taiyuan (CN); Hongzhou Lv, Taiyuan (CN)

(73) Assignee: SHANXI UNIVERSITY, Taiyuan (CN)

( * ) Notice: Subject to any disclaimer, the term of this patent is extended or adjusted under 35 U.S.C. 154(b) by 0 days.

(21) Appl. No.: 18/507,950

(22) Filed: Nov. 13, 2023

(65) Prior Publication Data
US 2024/0166528 A1    May 23, 2024

(30) Foreign Application Priority Data
Nov. 15, 2022   (CN) .......................... 202211423404.2

(51) Int. Cl.
*C01F 5/40*    (2006.01)
(52) U.S. Cl.
CPC ............ *C01F 5/40* (2013.01); *C01P 2004/12* (2013.01); *C01P 2004/61* (2013.01)
(58) Field of Classification Search
CPC ...... C01F 5/30; C01P 2004/12; C01P 2004/61
See application file for complete search history.

(56) References Cited

U.S. PATENT DOCUMENTS

2018/0155533 A1\* 6/2018 Saito .................. C08K 9/04

FOREIGN PATENT DOCUMENTS

| CN | 109355703 A | 2/2019 |
|---|---|---|
| CN | 111793827 A | 10/2020 |
| CN | 114134574 A | 3/2022 |

(Continued)

OTHER PUBLICATIONS

First Office Action issued in Chinese Application No. 202211423404.2; mailed Dec. 21, 2022; 18 pgs.

(Continued)

*Primary Examiner* — Richard M Rump
(74) *Attorney, Agent, or Firm* — HAUPTMAN HAM, LLP

(57) ABSTRACT

A device for creating hollow tubes of crystalline magnesium sulphate sized a micron pertains to the production technology for inorganic micron-scale materials. The device consist of two halogenation tanks, a solar collector, a temperature-controlled crystallization chamber, a centrifuge, a conveyor belt, and a dryer. The solar collector is connected to a heat pipe at the bottom of a brine pool to form a circulation path. Said method is to convert high magnesium brine into saturated brine with a $Mg^{2+}:Na^+$ mass ratio between (8~15):1 by a brine blending operation at a temperature of 60° C.~90° C. it is controlled to be cooled and crystallized at a cooling rate of 0.6~2.0° C./min, solid-liquid centrifugal separation is carried out when it is cooled down to 40~48.5° C., and the solid phase is dried at a temperature of 48.5~70° C., and finally micron-sized crystalline magnesium sulfate hollow tubes are obtained.

3 Claims, 1 Drawing Sheet

(56) References Cited

FOREIGN PATENT DOCUMENTS

Figure 1:
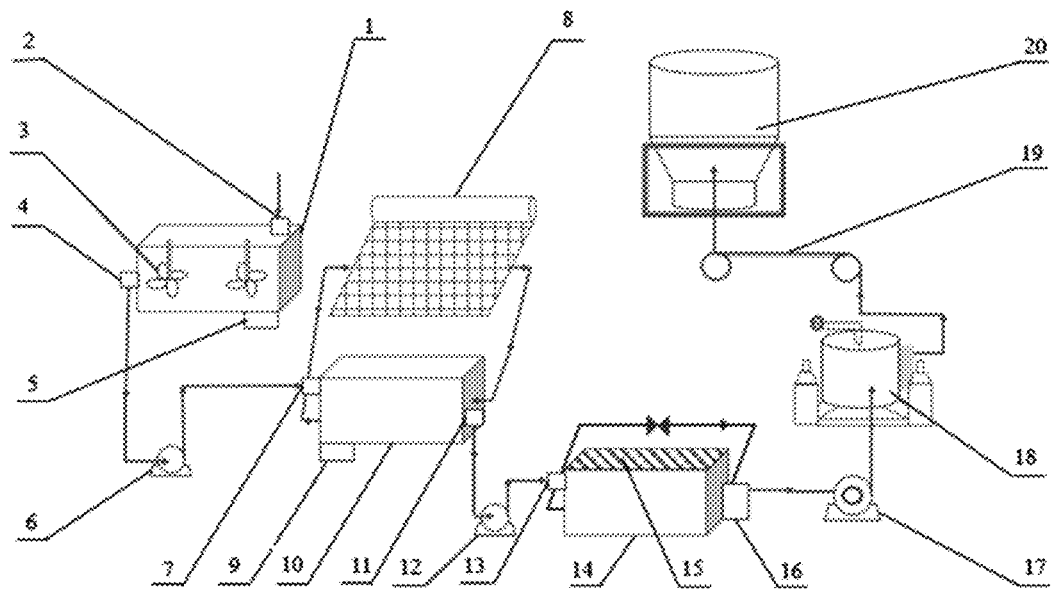

| | | |
|---|---|---|
| CN | 114318367 A | 4/2022 |
| CN | 114477247 A | 5/2022 |

OTHER PUBLICATIONS

Notification to Grant Patent Right for Invention issued in Chinese Application No. 202211423404.2; mailed Dec. 30, 2022; 3 pgs.
Cheng, Huigang; Applied technology achievements; "A method for extracting high-purity magnesium hexahydrate sulfate from a brine"; Science and Technology Project, China Innovation Appraisal Database (CNKI version); University of Shanxi, approved Nov. 3, 2017; 6 pgs.

\* cited by examiner

DEVICE AND METHOD FOR MAKING A HOLLOW TUBE OF MICRON-SIZED CRYSTALLINE MAGNESIUM SULFATE

RELATED APPLICATION

The present application claims priority from Chinese Application Number 202211423404.2 filed Nov. 15, 2022, the disclosure of which is hereby incorporated by reference herein in its entirety.

TECHNICAL FIELD

The invention belongs to a production technology of inorganic micron material, in particular to a device and method for preparing a hollow tube of micron-sized crystalline magnesium sulfate.

BACKGROUND TECHNIQUE

Micron-scale hollow tubes can be made of carbon, zinc oxide, vanadium dioxide, titanium dioxide and iron diselenide, etc. The finished products can be used for heat insulation materials, sound-absorbing materials, hydrogen storage materials, phase change material capsules, etc., and have broad prospects for popularization in the functionalization of applications such as heat insulation, sound-absorbing and storage. Various preparation techniques of micron-sized hollow tubes have embodied the characteristics of high-value processing, and the prepared micron-sized hollow tubes have fine structures and high application values, but there are some technical and economic challenges, for example, the raw materials for the preparation of micron-sized carbon hollow tubes are usually biomasses such as willow floss and moss, which have resulted in high production costs and small sized finished products because of the low natural yield, small size, and not easy to recycle of these raw materials; Zinc oxide microscopic structure of the main preparation method for the gas phase deposition method, the reaction process needs to add a metal catalyst to catalyze the reaction process, the cost is high, easy to cause metal pollution problems; iron diselenide microscopic structure of the preparation process there is a step in the selenide reaction, the reaction requires a very high temperature, and the time is longer, and the quality of the product is not easy to control. In this case, analyzing from the demand of technical economy, the selection of raw materials and preparation method of micron-grade hollow tubes can be further upgraded and improved in the actual production. In this case, analyzing from the technical and economic needs, the selection of raw materials and preparation methods of micron-grade hollow tubes can be further upgraded and improved in the actual production.

China's salt lake boasts abundant resources, particularly potassium and sodium salts. In recent years, advancements in technology have enabled rapid development of comprehensive utilization of magnesium resources from the salt lake, including the production of magnesium alloy and magnesium-based construction materials using salt lake magnesium chloride and the conversion and preparation of high-purity magnesium sulfate. However, the utilization of high-value magnesium resources still remains limited. Therefore, a series of magnesium-based products should be developed to enhance the added value of magnesium products from the salt lake. For instance, rich magnesium resources extracted from the salt lake can be utilized to prepare magnesium salt whiskers and nanoscale magnesium salt products, among others. Some cases of high value utilization of magnesium salt are representative, such as the patent (CN201811391039.5) prepared magnesium oxide whiskers by using hydrothermal-alkaline magnesium chloride precursor system, the patent (CN202111416758.X) introduces a method to prepare alkaline magnesium sulfate whiskers with a high aspect ratio, the patent (CN202210343176.1) introduces A microwave-induced combustion method synthesized magnesium oxide nanoparticles, Patent (CN201910280794.4) prepared 153-type basic magnesium sulfate whiskers under atmospheric pressure, and Patent (CN202210019610.0) describes a method to prepare highly dispersed modified magnesium hydroxide nanoparticles. Since the magnesium salt products with the above special morphology belong to solid materials such as whiskers and nanoparticles, these solid materials do not have ideal functions such as heat insulation, sound absorption and storage compared with materials with hollow structures such as micron-level hollow tubes.

Considering the application demand of micron level hollow pipe in energy storage, barrier and other fields, the development of high-quality and low-cost micron level hollow pipe preparation technology can significantly promote the development of these fields. Salt lake magnesium resources are abundant and cheap and easy to obtain, but there are no reports of large-scale preparation of micron-scale empty tubes. Meanwhile, many studies have confirmed that the morphology of magnesium salts in salt lakes such as magnesium sulfate crystalline salts is controllable, and crystal rods and particles can be formed in addition to needle-like and whisker-like shapes. Based on the above technical status, if micron-scale crystalline magnesium sulfate hollow tube can be prepared by adjusting the crystal shape during the crystallization process of magnesium sulfate, the production cost of micron-scale hollow tube will be greatly reduced, and a new way can be provided for the high value utilization of magnesium resources in salt lakes.

Content of Invention

The invention aims to provide a device and method for making a hollow tube of micron-sized crystalline magnesium sulfate, which can be separated from brine rich in magnesium ions to obtain micron-sized crystalline magnesium sulfate hollow tube.

The invention adopts the following technical scheme:

A device for making hollow tubes of micron-sized crystalline magnesium sulfate, including a halogenation tank I, a halogenation tank II, a solar collector, a temperature-controlled crystallization chamber, a centrifuge, a conveyor belt and a dryer.

The top of the halogenation tank I is provided with a brine inlet I, the side is provided with a brine outlet I, the bottom is provided with a slag outlet I, the halogenation tank I is provided with a stirring paddle.

The halogenation tank II features a brine inlet II at the top, a brine outlet II on the side, and a slag outlet II at the bottom. Additionally, a heat conduction pipe is located at the bottom of the halogenation tank II, which is connected to the solar collector and equipped with a fresh water supply.

The temperature controlled crystallization chamber is provided with a brine inlet III on one side, a salt slurry outlet on the other side, an insulated cover plate on top, and a cooling water pipe is laid at the bottom of the temperature controlled crystallization chamber.

The brine outlet I of the halogenation tank I is connected to the brine inlet II of the halogenation tank II through the pipeline, and the pipeline is equipped with a water pump I. The brine outlet II of the halogenation tank II is connected to the brine inlet III of the temperature-controlled crystallization chamber through a pipeline, and the pipeline is provided with a water pump II. The salt slurry outlet of the temperature-controlled crystallization chamber is connected to the inlet of the centrifuge via a pipeline with a salt slurry pump. The outlet of the centrifuge is connected to the dryer via a conveyor belt.

A method for making a hollow tube of micron-sized crystalline magnesium sulfate, comprising the steps of:

In the first step, brine with high magnesium is selected as the raw material, and the brine is injected into the halogenation tank I through the brine inlet I.

In the second step, sprinkle 60-270 μm gypsum hemihydrate or anhydrite powder onto the surface layer of the brine liquid phase in the halogenation tank I. The dosage of gypsum hemihydrate or anhydrite powder should follow the 1-15 kg/m³ brine count. After stirring with a mixing paddle, allow the mixture to rest for 20-180 minutes.

The third step involves adding sodium carbonate powder of particle size 60-270 μm to the liquid phase surface layer of the halogenation tank I. The dosage of sodium carbonate powder should follow the 3-10 kg/m³ brine count. Mix the powder using mixing paddle and then leave it static for 60-300 minutes.

In the fourth step, the clear liquid of the upper layer of the brine after resting is discharged into the halogenation tank II through the brine outlet I of the halogenation tank I, the water pump I and the brine inlet II, and the slurry of the bottom layer is discharged through the slag outlet I.

In the fifth step, use solar collectors to connect to the bottom of the heat conduit in brine pool II. Heat the clear liquid in the brine upper layer to 60 to 90° C. and adjust it to a saturated mass ratio of $Mg^{2+}:Na^+$ in the upper layer of clear liquid of the brine (8-15):1 using mirabilite (sodium sulfate decahydrate) or bischofite (magnesium chloride hexahydrate). Then the mixture of salt of mirabilite and bischofite with a mass ratio of $Mg^{2+}:Na^+$ of 10:1 is added to the brine until the mixture of salt precipitates in the brine to the bottom of the halogenation tank II and no longer dissolved. The mixture was then left to stand for 20 to 180 minutes.

In the sixth step, the clear liquid of the upper layer of the brine after resting is discharged into the temperature-controlled crystallization chamber through the brine outlet II of the halogenation tank II, the water pump II and the brine inlet III, and the slurry of the bottom layer is discharged through the slag outlet II.

In a seventh step, the insulating cover of the temperature-controlled crystallization chamber is covered so that the brine is allowed to stand in the temperature-controlled crystallization chamber for 3-10 minutes.

The eighth step is to cool the brine after standing, and adjust the cooling rate of the brine in the temperature-controlled crystallization chamber by adjusting the flow rate of the cooling water in the cooling water pipe at the bottom of the temperature-controlled crystallization chamber;

In the ninth step, when the brine is cooled, the upper clear liquid layer of the brine in the temperature-controlled crystallization chamber is discharged, and the slurry containing the solid phase of the crystallized salt is discharged into the centrifuge through the salt slurry outlet and the salt slurry pump to be centrifuged for centrifugal separation, and the centrifugal separation time is controlled to be in the range of 1-10 minutes.

In the tenth step, the filter cake obtained through centrifugal separation using centrifuge is transported to the dryer via conveyor belt. Following the drying process, a hollow tube of crystalline magnesium sulfate at the micron level is obtained.

Further, the brine described in the first step is $Mg^{2+}$, $Na^+//Cl^-$, $SO_4^{2-}$—$H_2O$ system brine, in which the mass content of $MgCl_2$ is more than 30%.

Further, in the fifth step, adjust the upper layer of the brine to a saturated solution with a mass ratio of $Mg^{2+}:Na^+$ between 8:1 and 15:1. The adjustment is carried out by adding bischofite to the brine if the ionic mass ratio of $Mg^{2+}:Na^+$ is less than 8:1. Conversely, if the ionic mass ratio of $Mg^{2+}:Na^+$ is more than 15:1, add mirabilite to the brine.

Further, the cooling rate stated in the eighth step is −0.6 to −2.0° C./min.

Further, the final temperature of said brine cooling in the ninth step is 40-48.5° C.

Further, the drying temperature mentioned in the tenth step is 48.5-70° C.

The principle of this invention is: By regulating the mass ratio of magnesium and sodium in the $Mg^{2+}$, $Na^+//Cl^-$, $SO_4^{2-}$—$H_2O$ system, whilst controlling the cooling rate of the system during crystallization. This is accomplished via dynamic variable-temperature crystallization, resulting in the generation of nuclei of different sizes. Subsequently, small nuclei are dissolved and redeposited onto the outer surfaces of larger nuclei, ultimately producing micrometer-sized crystalline magnesium sulfate hollow tubes with pores.

The invention has the following beneficial effects:

The invention aims to provide a device and a method for preparing an empty tube in micron crystalline magnesium sulfate, which is easy to operate and capable of producing a micron tube with a hollow structure. Compared with the existing patents and research reports, the invention is characterized in that in the non-equilibrium system, by regulating the mass ratio of magnesium to sodium, in the temperature change process of controlling the cooling rate, the mechanism of crystal competitive adsorption and Ostwald maturation effect is used to make the difference in the growth size of the crystal nucleus in the early crystallization stage, and the smaller crystal nucleus will dissolve and deposit on the outer surface of the larger crystal nucleus later. The formation of internal voids realizes the production of micron-level hollow pipe in the salt pond, expands the application scope of magnesium salt, and also expands the raw material source of micron-level hollow pipe. The invention has the advantage that the process method is easy to operate and plays a role in improving efficiency in production; The hollow micron structure of the magnesium sulfate can be controlled by adjusting the cooling rate. The micron hollow tube has a polygonal cross section, the length is about 50~500μm, the outer diameter is about 30~100 μm, the wall thickness is about 5~15 μm, and the mass content of micron tubes in the product can be 30%~70%. The resulting magnesium sulfate product may contain magnesium-sodium complex salts.

In summary, the invention has simple flow, can produce high value-added micron level hollow pipe, can reduce the production cost of micron level hollow pipe, and has strong practicability.

ILLUSTRATED DESCRIPTION

FIG. 1 is a schematic diagram of a device for preparing a hollow tube of micron-sized crystalline magnesium sulfate.

Among them: 1—halogenation tank I; 2—Brine inlet I; 3—Stirring paddle; 4—Brine outlet I; 5—Slag outlet I; 6—Water pump I; 7—brine inlet II; 8—Solar collectors;

9—Slag outlet II; 10—halogenation tank II; 11—Brine outlet II; 12—Water pump II; 13—Brine inlet III; 14—Temperature controlled crystallization chamber; 15—Insulation cover plate; 16—Salt slurry outlet; 17—Salt slurry pump; 18—Centrifuge; 19—Conveyor belt; 20—Drier.

Figure 2:
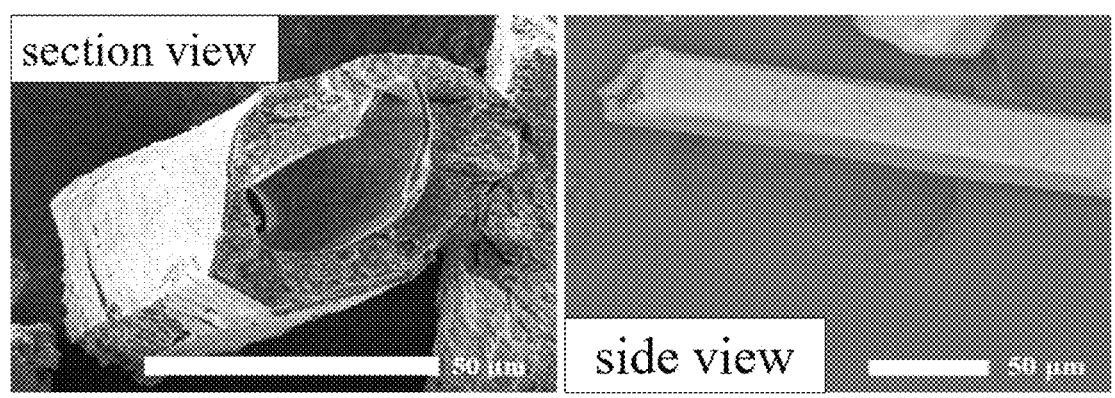

FIG. 2 is a schematic diagram of product electron microscopy for preparing hollow tubes in micron crystalline magnesium sulfate in embodiment 1 of the invention (observation after crushing).

CONCRETE IMPLEMENTATION MODE

The invention is further explained by specific embodiments below.

Example 1

This embodiment provides a device for making a hollow tube of micron-sized crystalline magnesium sulfate, including a halogenation tank I (1), a halogenation tank II (10), a solar collector (8), a temperature-controlled crystallization chamber (14), a centrifuge (18), a conveyor belt (19) and a dryer (20).

The top of the halogenation tank I (1) is provided with a brine inlet I (2), the side is provided with a brine outlet I (4), the bottom is provided with a slag outlet I (5), the halogenation tank I (1) is provided with a stirring paddle (3).

The halogenation tank I (1) is equipped with a brine inlet I (2) at the top, a brine outlet I (4) on the side, and a slag outlet I (5) at the bottom. Additionally, there is a stirring paddle (3) inside the halogenation tank I (1).

The halogenation tank II (10) features a brine inlet II (7) at the top, a brine outlet II (11) on the side, and a slag outlet II (9) at the bottom. Additionally, a heat conduction pipe is located at the bottom of the halogenation tank II (10), which is connected to the solar collector (8) and equipped with a fresh water supply.

The temperature controlled crystallization chamber (14) is provided with a brine inlet III (13) on one side, a salt slurry outlet (16) on the other side, an insulated cover plate (15) on top, and a cooling water pipe is laid at the bottom of the temperature controlled crystallization chamber (14).

The brine outlet I (4) of the halogenation tank I (1) is connected to the brine inlet II (7) of the halogenation tank II (10) through the pipeline, and the pipeline is equipped with a water pump I (6). The brine outlet II (11) of the halogenation tank II (10) is connected to the brine inlet III (13) of the temperature-controlled crystallization chamber (14) through a pipeline, and the pipeline is provided with a water pump II (12). The salt slurry outlet (16) of the temperature-controlled crystallization chamber (14) is connected to the inlet of the centrifuge (18) via a pipeline with a salt slurry pump (17). The outlet of the centrifuge (18) is connected to the dryer (20) via a conveyor belt (19).

The present embodiment provides a method for making a hollow tube of micron-sized crystalline magnesium sulfate, comprising the steps of:

In the first step, brine with high magnesium is selected as the raw material, and the brine is injected into the halogenation tank I (1) through the brine inlet I (2).

In the second step, sprinkle 60 μm gypsum hemihydrate or anhydrite powder onto the surface layer of the brine liquid phase in the halogenation tank I (1). The dosage of gypsum hemihydrate should follow the 1 kg/m$^3$ brine count. After stirring with a mixing paddle (3), allow the mixture to rest for 20 minutes.

The third step involves adding sodium carbonate powder of particle size 60 μm to the liquid phase surface layer of the halogenation tank I (1). The dosage of sodium carbonate powder should follow the 3 kg/m$^3$ brine count. Mix the powder using mixing paddle (3) and then leave it static for 60 minutes.

In the fourth step, the clear liquid of the upper layer of the brine after resting is discharged into the halogenation tank II (10) through the brine outlet I (4) of the halogenation tank I (1), the water pump I (6) and the brine inlet II (7), and the slurry of the bottom layer is discharged through the slag outlet I (5).

In the fifth step, use solar collectors (8) to connect to the bottom of the heat conduit in the halogenation tank II (10). Heat the clear liquid in the brine upper layer to 60° C. and adjust it to a saturated mass ratio of $Mg^{2+}$:$Na^+$ in the upper layer of clear liquid of the brine 8:1 using mirabilite (sodium sulfate decahydrate) or bischofite (magnesium chloride hexahydrate). Then the mixture of salt of mirabilite and bischofite with a mass ratio of $Mg^{2+}$:$Na^+$ of 8:1 is added to the brine until the mixture of salt precipitates in the brine to the bottom of the halogenation tank II (10) and no longer dissolved. The mixture was then left to stand for 20 minutes.

In the sixth step, the clear liquid of the upper layer of the brine after resting is discharged into the temperature-controlled crystallization chamber (14) through the brine outlet II (11) of the halogenation tank II (10), the water pump II (12) and the brine inlet III (13), and the slurry of the bottom layer is discharged through the slag outlet II (9).

In a seventh step, the insulating cover (15) of the temperature-controlled crystallization chamber (14) is covered so that the brine is allowed to stand in the temperature-controlled crystallization chamber (14) for 3 minutes.

The eighth step is to cool the brine after standing, and adjust the cooling rate of the brine in the temperature-controlled crystallization chamber (14) by adjusting the flow rate of the cooling water in the cooling water pipe at the bottom of the temperature-controlled crystallization chamber (14);

In the ninth step, when the brine is cooled, the upper clear liquid layer of the brine in the temperature-controlled crystallization chamber (14) is discharged, and the slurry containing the solid phase of the crystallized salt is discharged into the centrifuge (18) through the salt slurry outlet (16) and the salt slurry pump (17) to be centrifuged for centrifugal separation, and the centrifugal separation time is controlled to be in the range of 1 minutes.

In the tenth step, the filter cake obtained through centrifugal separation using centrifuge (18) is transported to the dryer (20) via conveyor belt (19). Following the drying process, a hollow tube of crystalline magnesium sulfate at the micron-sized is obtained.

Further, the brine described in the first step is $Mg^{2+}$, $Na^+$//$Cl^-$, $SO_4^{2-}$—$H_2O$ system brine, in which the mass content of $MgCl_2$ is more than 30%. Specifically, it is the old brine rich in $MgCl_2$ components after potassium extraction in the mining area of Ma Hai Salt Lake in Qaidam Basin, Qinghai Province, and the mass content of the main ions in the brine is 0.12% for Nat, 8.94% for $Mg^{2+}$, 26.69% for $Cl^-$, 2.32% for $SO_4^{2-}$, and the total amount of $K^+$ and other hetero-salt ions is less than 2.00%, which is 35.39% of the mass content of $MgCl_2$ according to the calculation of the $Mg^{2+}$ in the brine in the form of $MgCl_2$. The mass content of $MgCl_2$ in the brine is 35.39%.

Further, In the fifth step, adjust the upper layer of the brine to a saturated solution with a mass ratio of $Mg^{2+}$:$Na^+$ in 8:1. The adjustment is carried out by adding bischofite to the brine if the ionic mass ratio of $Mg^{2+}:Na^+$ is less than 8:1. Conversely, if the ionic mass ratio of $Mg^{2+}:Na^+$ is more than 8:1, add mirabilite to the brine.

Further, the cooling rate stated in the eighth step is −0.6° C./min.

Further, the final temperature of said brine cooling in the ninth step is 40° C.

Further, the drying temperature mentioned in the tenth step is 48.5° C.

The average length of the micron-sized crystalline magnesium sulfate hollow tube product obtained in this embodiment is 280 lam, the average outer diameter is 51 lam, the average wall thickness is 11 µm, and the mass content of micron tubes in the product can be 70.0%. FIG. 2 illustrates the electron microscope schematic diagram of the product of this embodiment for the preparation of the micron-sized crystalline magnesium sulfate hollow tube (observed after crushing).

Example 2

The method and workflow are the same as in Example 1. With the difference that the mass content of the major ions in the brine used is 0.24% Nat, 7.59% $Mg^{2+}$, 23.60% $Cl^-$, 2.60% $SO_4^{2-}$, and the total amount of miscellaneous salt ions, such as $K^+$, is less than 3%. The second step, to the halogenation tank I 1 in the brine liquid phase surface layer into the particle size of 270 µm gypsum hemihydrate powder, gypsum hemihydrate powder dosage in accordance with the 8 kg/m³ brine count, the use of stirring paddle 3 stirring and then left to stand for 20 minutes. After stirring with stirring paddle 3, it is left for 20 minutes. The cooling rate stated in the eighth step is −1.28° C./min.

The average length of the micron-sized crystalline magnesium sulfate hollow tube product obtained in this embodiment is 54 lam, and the average outer diameter is 31 µm, the average wall thickness is 6 µm, and the mass content of micron tubes in the product can be 56.3%.

Example 3

The method and workflow are the same as in Example 1. The difference is that in the fifth step, first the upper layer of the clear brine liquid is heated to 80° C. by using the heat pipe at the bottom of the halogenation tank II 10 connected to the solar collector 8, and then the upper layer of the clear brine liquid is adjusted to the saturated brine with a mass ratio of $Mg^{2+}:Na^+$ of 10:1 by adding mirabilite (sodium sulfate decahydrate) or bischofite (magnesium chloride hexahydrate) to the brine. Then the mixture of salt of mirabilite and bischofite with a mass ratio of $Mg^{2+}:Na^+$ of 10:1 is added to the brine until the mixture of salt precipitates in the brine to the bottom of the pool II 10 and no longer dissolved, and then left to stand for 100 minutes. The drying temperature mentioned in the tenth step is 61° C.

Further, in the fifth step, when the supernatant of the brine is adjusted to a saturated brine with a mass ratio of $Mg^{2+}:Na^+$ at 10:1, the operation method is as follows: If the mass ratio of ions in the brine is $Mg^{2+}:Na^+<10:1$, add bischofite to the brine. If the mass ratio of ions in the brine is $Mg^{2+}:Na^{2+}>10:1$, mirabilite is added to the brine.

The average length of the micron-sized crystalline magnesium sulfate hollow tube product obtained in this embodiment is 190 µm, and the average outer diameter is 36 µm, the average wall thickness is 9 µm, and the mass content of micron tubes in the product can be 42.5%.

Example 4

The method and workflow are the same as in Example 1. The difference is that in the third step, sodium carbonate powder with a particle size of 120 µm is sprinkled into the surface layer of the brine liquid phase in the halogenation tank I 1, and the dosage of sodium carbonate powder should follow the 6 kg/m³ brine count. Stirred using stirring paddle 3 and then left to stand for 200 minutes. The final temperature of the brine cooling described in the ninth step is 45° C., and the centrifugal separation time is controlled at 6 minutes.

The average length of the micron-sized crystalline magnesium sulfate hollow tube product obtained in this embodiment is 290 µm, and the average outer diameter is 46 µm, the average wall thickness is 12 µm, and the mass content of micron tubes in the product can be 46.2%.

Example 5

The method and workflow are the same as in Example 1. The difference is that in the fifth step, first the upper layer of the clear brine liquid is heated to 90° C. by using the heat pipe at the bottom of the halogenation tank II 10 connected to the solar collector 8, and then the upper layer of the clear brine liquid is adjusted to the saturated brine with a mass ratio of $Mg^{2+}:Na$ of 15:1 by adding mirabilite (sodium sulfate decahydrate) or bischofite (magnesium chloride hexahydrate) to the brine. Then the mixture of salt of mirabilite and bischofite with a mass ratio of $Mg^{2+}:Na^+$ of 15:1 is added to the brine until the mixture of salt precipitates in the brine to the bottom of the halogenation tank II 10 and no longer dissolved, and then left to stand for 180 minutes. The seventh step is to let the brine stand for 6 minutes in the controlled temperature crystallization chamber 14.

Further, in the fifth step, when the supernatant of the brine is adjusted to a saturated brine with a mass ratio of $Mg^{2+}:Na^+$ at 15:1, the operation method is as follows: If the mass ratio of ions in the brine is $Mg^{2+}:Na^+<15:1$, add bischofite to the brine. If the mass ratio of ions in the brine is $Mg^{2+}:Na^+>15:1$, mirabilite is added to the brine.

The average length of the micron-sized crystalline magnesium sulfate hollow tube product obtained in this embodiment is 330 µm, and the average outer diameter is 52 µm, the average wall thickness is 12.5 µm, and the mass content of micron tubes in the product can be 30.4%.

Example 6

The method and workflow are the same as in Example 1. The difference is that in the second step, sprinkle 270 µm gypsum hemihydrate or anhydrite powder onto the surface layer of the brine liquid phase in the halogenation tank I 1. The dosage of anhydrite powder should follow the 15 kg/m³ brine count. After stirring with a mixing paddle 3, allow the mixture to rest for 120 minutes. The cooling rate described in the eighth step is −2.0° C./min. The drying temperature described in the tenth step is 70° C.

The average length of the micron-sized crystalline magnesium sulfate hollow tube product obtained in this embodiment is 450 µm, and the average outer diameter is 67 µm, the average wall thickness is 13 µm, and the mass content of micron tubes in the product can be 51.8%.

Example 7

The method and workflow are the same as in Example 1. The difference is that in the second step, sprinkle 60 µm gypsum hemihydrate or anhydrite powder onto the surface layer of the brine liquid phase in the halogenation tank I 1. The dosage of anhydrite powder should follow the 6 kg/m³ brine count. After stirring with a mixing paddle 3, allow the mixture to rest for 180 minutes. In the seventh step, the brine is allowed to stand for 10 minutes in a temperature-controlled crystallization chamber 14.

The average length of the micron-sized crystalline magnesium sulfate hollow tube product obtained in this embodiment is 492 μm, and the average outer diameter is 81 μm, the average wall thickness is 11.5 μm, and the mass content of micron tubes in the product can be 35.7%.

Example 8

The method and workflow are the same as in Example 1. The difference is that in the third step, sodium carbonate powder with a particle size of 270 μm is sprinkled into the surface layer of the brine liquid phase in the halogenation tank I 1, and the dosage of sodium carbonate powder should follow the 10 kg/m³ brine count. Stirred using stirring paddle 3 and then left to stand for 300 minutes. The final temperature of brine cooling described in the ninth step is 48.5° C., and the centrifugal separation time is controlled at 10 minutes.

The average length of the micron-sized crystalline magnesium sulfate hollow tube product obtained in this embodiment is 342 μm, and the average outer diameter is 96 μm, the average wall thickness is 15 μm, and the mass content of micron tubes in the product can be 63.6%.

The foregoing are only preferred embodiments of the present invention and are not intended to limit the invention. Various changes and variations of the present invention are possible for those skilled in the art. Any modifications, equivalent substitutions, improvements, etc. made within the spirit and principles of the present invention shall be included in the scope of protection of the present invention.

The invention claimed is:

1. A method for making a hollow tube of micron-sized crystalline magnesium sulfate comprising: using a device having a halogenation tank I, a halogenation tank II, a solar collector, a temperature-controlled crystallization chamber, a centrifuge, a conveyor belt and a dryer, wherein
   a top of the halogenation tank I is provided with a brine inlet I, a side of the halogenation tank I is provided with a brine outlet I, a bottom of the halogenation tank I is provided with a slag outlet I, and the halogenation tank I is provided with a stirring paddle;
   a halogenation tank II features a brine inlet II at a top of the halogenation tank II, a brine outlet II on a side of the halogenation tank II, and a slag outlet II at bottom of the halogenation tank II, and a heat conduction pipe is located at the bottom of the halogenation tank II, which is connected to the solar collector and equipped with a fresh water supply;
   the temperature-controlled crystallization chamber is provided with a brine inlet III on one side of the temperature-controlled crystallization chamber, a salt slurry outlet on an other side of the temperature-controlled crystallization chamber, an insulated cover plate on a top of the temperature-controlled crystallization chamber, and a cooling water pipe is laid at a bottom of the temperature-controlled crystallization chamber;
   the brine outlet I of the halogenation tank I is connected to the brine inlet II of the halogenation tank II through a first pipeline, and the first pipeline is equipped with a water pump, the brine outlet II of the halogenation tank II is connected to a brine inlet III of the temperature-controlled crystallization chamber through a second pipeline, and the second pipeline is provided with a water pump II, the salt slurry outlet of the temperature-controlled crystallization chamber is connected to an inlet of the centrifuge via a third pipeline with a salt slurry pump, and an outlet of the centrifuge is connected to the dryer via the conveyor belt; and
   the preparation method further comprises regulating a mass ratio of magnesium and sodium in a $Mg^{2+}$, $Na^+$//$Cl^-$, $SO_4^{2-}$—$H_2O$ system, whilst controlling a cooling rate of the system during crystallization, which is accomplished via dynamic variable-temperature crystallization, resulting in generation of nuclei of different sizes, and then small nuclei are dissolved and redeposited onto outer surfaces of larger nuclei, ultimately producing micrometer-sized crystalline magnesium sulphate hollow tubes with pores, and
   the method further comprises:
   a first step, selecting brine with high magnesium as a raw material, and injecting the brine into the halogenation tank I through the brine inlet I;
   a second step, sprinkling 60-270 μm gypsum hemihydrate or anhydrite powder onto a surface layer of a brine liquid phase in the halogenation tank I, wherein a dosage of gypsum hemihydrate or anhydrite powder follows the 1-15 kg/m³ brine count, and after stirring with a mixing paddle, allowing a mixture to rest for 20-180 minutes;
   a third step, adding sodium carbonate powder of particle size 60-270 μm to the surface layer of the brine liquid phase in the halogenation tank I, wherein a dosage of sodium carbonate powder should follow the 3-10 kg/m³ brine count, and mixing the powder using the mixing paddle and then leave it leaving the powder static for 60-300 minutes;
   a fourth step, discharging a clear liquid of a upper layer of the brine after resting into the halogenation tank II through the brine outlet I of the halogenation tank I, the water pump I and the brine inlet II, and discharging a slurry of a bottom layer through the slag outlet I;
   a fifth step, using solar collectors to connect to a bottom of a heat conduit in the halogenation tank II, heating the clear liquid in the upper layer of the brine to 60-90° C. and heating the clear liquid to a saturated mass ratio of $Mg^{2+}$:$Na^+$ in the upper layer of clear liquid of the brine (8-15):1 using mirabilite or bischofite, then adding a mixture of salt of mirabilite and bischofite with a mass ratio of $Mg^{2+}$:$Na^+$ of (8-15):1 to the brine until the mixture of salt precipitates in the brine to the bottom of the halogenation tank II and no longer dissolved, and then leaving the mixture to stand for 20-180 minutes;
   a sixth step, discharging the clear liquid of the upper layer of the brine after resting into the temperature-controlled crystallization chamber through the brine outlet II of the halogenation tank II, the water pump II and the brine inlet III, and discharging the slurry of the bottom layer through the slag outlet II;
   a seventh step, covering the insulated cover plate of the temperature-controlled crystallization chamber so that the brine is allowed to stand in the temperature-controlled crystallization chamber for 3-10 minutes;
   an eighth step, cooling the brine after standing, and adjusting a cooling rate of the brine in the temperature-controlled crystallization chamber by adjusting a flow rate of a cooling water in the cooling water pipe at the bottom of the temperature-controlled crystallization chamber;

a ninth step, when the brine is cooled, discharging the upper layer of the clear liquid of the brine in the temperature-controlled crystallization chamber, and discharging a slurry containing the solid phase of the crystallized salt into the centrifuge through the salt slurry outlet and the salt slurry pump to be centrifuged for centrifugal separation, and controlling a centrifugal separation time to be in the range of 1-10 minutes;

a tenth step, transporting a filter cake obtained through centrifugal separation using centrifuge to the dryer via the conveyor belt, and following a drying process, obtaining a hollow tube of crystalline magnesium sulfate at a micron level;

wherein the brine described in the first step is $Mg^{2+}$, $Na^+//Cl^-$, $SO_4^{2-}$—$H_2O$ system brine, in which a mass content of $MgCl_2$ is more than 30%;

wherein the fifth step further comprises, adjusting the upper layer of the brine to a saturated solution with a mass ratio of $Mg^{2+}:Na^+$ between 8:1 and 15:1, the adjustment is carried out by adding bischofite to the brine in response to the mass ratio of $Mg^{2+}:Na^+$ being less than 8:1, and conversely, in response to the ionic mass ratio of $Mg^{2+}:Na^{2+}$ being more than 15:1, adding mirabilite to the brine; and wherein the cooling rate stated in the eighth step is $-0.6$ to $-2.0°$ C./min.

2. The method of making the hollow tube of micron-sized crystalline magnesium sulfate according to claim 1, wherein a final temperature of cooling the brine in the ninth step is 40-48.5° C.

3. The method of making the hollow tube of micron-sized crystalline magnesium sulfate according to claim 1, wherein a drying temperature in the tenth step is 48.5-70° C.

\* \* \* \* \*